United States Patent
Zhang et al.

(10) Patent No.: US 12,442,721 B2
(45) Date of Patent: Oct. 14, 2025

(54) SYSTEM AND METHOD FOR DISTRIBUTED NETWORKED TEST OF ELECTRIC VEHICLES, STORAGE MEDIUM AND TERMINAL DEVICE

(71) Applicant: SHANDONG UNIVERSITY, Shandong (CN)

(72) Inventors: Chenghui Zhang, Shandong (CN); Qi Zhang, Shandong (CN); Ke Li, Shandong (CN); Naxin Cui, Shandong (CN); Yunlong Shang, Shandong (CN); Bin Duan, Shandong (CN)

(73) Assignee: SHANDONG UNIVERSITY, Shandong (CN)

( * ) Notice: Subject to any disclaimer, the term of this patent is extended or adjusted under 35 U.S.C. 154(b) by 326 days.

(21) Appl. No.: 18/010,462

(22) PCT Filed: Jun. 15, 2021

(86) PCT No.: PCT/CN2021/100156
§ 371 (c)(1),
(2) Date: Dec. 15, 2022

(87) PCT Pub. No.: WO2021/254340
PCT Pub. Date: Dec. 23, 2021

(65) Prior Publication Data
US 2023/0184627 A1 Jun. 15, 2023

(30) Foreign Application Priority Data
Jun. 16, 2020 (CN) .......................... 202010547829.9

(51) Int. Cl.
G01M 17/007 (2006.01)
G07C 5/00 (2006.01)
(Continued)

(52) U.S. Cl.
CPC ........... G01M 17/007 (2013.01); G07C 5/008 (2013.01); H04L 67/10 (2013.01); H04L 67/12 (2013.01)

(58) Field of Classification Search
CPC ...... G01M 17/007; G07C 5/008; H04L 67/10; H04L 67/12
See application file for complete search history.

(56) References Cited

U.S. PATENT DOCUMENTS 10,343,468 B2 * 7/2019 Cyllik ................ B60C 23/0455
2010/0300192 A1 12/2010 Isomura
(Continued)

FOREIGN PATENT DOCUMENTS

| CN | 103281388 | 9/2013 |
| CN | 105865804 | 8/2016 |

(Continued)

OTHER PUBLICATIONS

"International Search Report (Form PCT/ISA/210) of PCT/CN2021/100156," mailed on Aug. 18, 2021, with English translation thereof, pp. 1-7.

(Continued)

Primary Examiner — Luke Huynh
(74) Attorney, Agent, or Firm — JCIRPNET

(57) ABSTRACT

Provided is a system and method for the distributed networked test of electric vehicles based on a cloud platform, comprising a cloud computing platform and a plurality of remote test benches, wherein the remote test benches, being provided at least two, to form a remote distributed networked structure and transmit test data to the cloud computing platform; the cloud computing platform, being in real-time bidirectional data communication with the remote test bench and configured to receive each test data in real-time, perform a data cleaning, a data classing washing, (Continued)

a data fusion and a data mining, extract useful data information from the test data, build corresponding a data model and a mechanism model on the cloud computing platform according to historical data and a mechanism of control object, control for different test benches, and complete a fault diagnosis and an early warning.

9 Claims, 1 Drawing Sheet

(51) Int. Cl.
    *H04L 67/10*     (2022.01)
    *H04L 67/12*     (2022.01)

(56) References Cited

U.S. PATENT DOCUMENTS

2019/0333291 A1* 10/2019 Liu .................... G06F 16/00
2020/0043256 A1    2/2020 Rocci et al.

FOREIGN PATENT DOCUMENTS

| | | |
|---|---|---|
| CN | 105928711 | 9/2016 |
| CN | 108197812 | 6/2018 |
| CN | 108228878 | 6/2018 |
| CN | 108303264 | 7/2018 |
| CN | 109218409 | 1/2019 |
| CN | 109407003 | 3/2019 |
| CN | 110096084 | 8/2019 |
| CN | 111176121 | 5/2020 |
| CN | 111678709 | 9/2020 |

OTHER PUBLICATIONS

"Written Opinion of the International Searching Authority (Form PCT/ISA/237) of PCT/ CN2021/100156," mailed on Aug. 18, 2021, with English translation thereof, pp. 1-10.
"Office Action of China Counterpart Application" with English translation thereof, issued on Jan. 26, 2021, p. 1-p. 22.

* cited by examiner

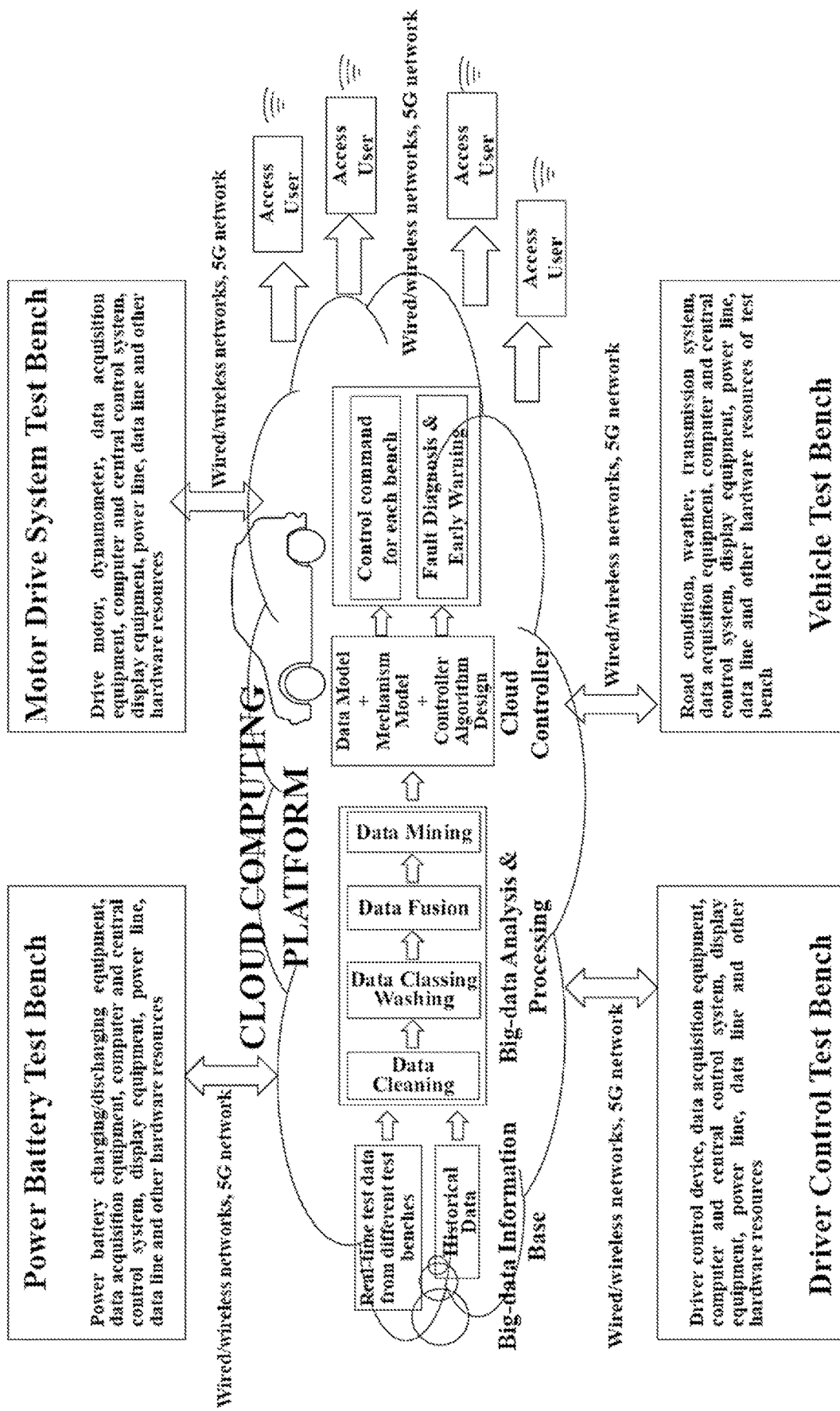

SYSTEM AND METHOD FOR DISTRIBUTED NETWORKED TEST OF ELECTRIC VEHICLES, STORAGE MEDIUM AND TERMINAL DEVICE

CROSS-REFERENCE TO RELATED APPLICATION

This application is a 371 of international application of PCT application serial no. PCT/CN2021/100156, filed on Jun. 15, 2021, which claims the priority benefit of China application no. 202010547829.9, filed on Jun. 16, 2020. The entirety of each of the above mentioned patent applications is hereby incorporated by reference herein and made a part of this specification.

TECHNICAL FIELD

The present invention belongs to the field of testing of power systems and key components of electric vehicles, and relates to a system and method for a distributed networked test of electric vehicles based on a cloud platform.

RELATED ART

The statements in the present section merely provide background technical information related to the present invention and do not necessarily constitute prior technology.

The inventor finds that in the field of new energy vehicles, especially hybrid electric vehicles, there are many types of test benches for power systems and parts thereof, mainly including hybrid power system test benches, motor drive system test benches, engine test benches, power battery charging and discharging test benches, gearbox and transmission system test benches, driver control test benches, etc. However, these test benches are independent and separate and have single function. It is difficult to build a complete vehicle test platform in a limited space, and these benches are limited to local test, test data need to be analysed and processed offline, and the calculation method is relatively single, and there are great deficiencies in function, calculation amount and calculation speed, etc., resulting in large error between test results and actual vehicle operation.

SUMMARY OF INVENTION

To solve the above problems, the present invention provides a system and method for the distributed networked test of electric vehicles based on a cloud platform, to construct a brand-new complete vehicle test platform in different spaces through a cloud computing platform, and to integrate independent test benches into a whole through the remote distributed networked test, which breaks through space restriction, and realizes remote real-time shared test; through the cloud computing platform, the calculation amount and the calculation speed are guaranteed, and the test efficiency and the reliability of the test bench are greatly improved.

According to some examples, the present invention adopts the following technical solutions:

a system for a distributed networked test of electric vehicles based on a cloud platform, comprising a cloud computing platform and a plurality of remote test benches, wherein:
the remote test benches, being provided at least two, to form a remote distributed networked structure and transmit test data to the cloud computing platform;
the cloud computing platform, being in real-time bidirectional data communication with the remote test bench and configured to receive each test data in real-time, perform a data cleaning, a data classing washing, a data fusion and a data mining, extract useful data information from the test data, build corresponding a data model and a mechanism model on the cloud computing platform according to historical data and a mechanism of control object, control for different remote test benches, and complete a fault diagnosis and an early warning.

The data model is a model built according to experimental test data, historical operation data and other data, and a specific method for building the data model is: organizing the data to form information; integrating and refining relevant information; forming an automatic decision-making model through training and fitting on the basis of the data. The mechanism model, also called white box model, is a model built through theoretical analysis, and a specific method for building the mechanism model is: building an accurate mathematical model according to the internal mechanism of object and production process or the transfer mechanism of material flow, which is generally the mathematical model of object or process obtained based on recognized equations, axioms, theorems, laws, etc.

As an alternative embodiment, the remote test benches comprises but is not limited to a hybrid power system test bench, a motor drive system test bench, an engine test bench, a power battery charging and discharging test bench, a gearbox and transmission system test bench, and a driver control test bench.

As an alternative embodiment, the cloud computing platform comprises a cloud controller, and the cloud controller is configured to build the data model and the mechanism model on the cloud computing platform according to the historical data and the mechanism of control object, determine control methods for different remote test benches, and complete the calculations of control instruction and the design of fault diagnosis and early warning function of each remote test bench.

As an alternative embodiment, the cloud computing platform comprises a communication module, and the communication module is configured for wired or wireless networks or/and 5G network communication modes.

As an alternative embodiment, the cloud computing platform is configured to send fault types to all online remote test benches and access users and display the fault types through the display module when receiving fault information from one or more remote test benches, and simultaneously issue a test pause control instruction to stop bench testing; after the fault information is eliminated, the collaborative test can be restarted.

As an alternative embodiment, the cloud computing platform receives the test data of each remote test bench in real-time, and stores the historical data of each remote test bench; the test data received in real-time and the historical data together form a big data information base of the cloud computing platform.

A method for a distributed networked test of electric vehicles, comprising following steps:
receiving test data from two or more remote test benches in real-time, and storing historical test data of each remote test bench;
completing a big data analysis and processing through data cleaning, data classing washing, data fusion, data mining, etc., and then extracting useful data information therefrom;

building a data model and a mechanism model according to historical data and a mechanism of control object, determining a control method aiming at different remote test benches and forming a control instruction; and transmitting and sending the control instruction and the information of fault diagnosis and early warning to each remote test bench for the test experiment.

A computer-readable storage medium, having stored therein a plurality of instructions, the instructions are adapted to be loaded by a processor of a terminal device and to execute a method for a distributed networked test of the electric vehicle.

A terminal device, comprising a processor and a computer-readable storage medium, the processor is used to implement instructions; the computer-readable storage medium is used for storing a plurality of instructions, and the instructions are adapted to be loaded by the processor and to execute a method for a distributed networked test of the electric vehicle.

Compared with the prior art, the advantages of the present invention are as follows:

According to the present invention, solving the problems that the traditional test benches for electric vehicle are single in function and cannot construct a complete vehicle test bench in a limited space, and the space restriction is broken through a cloud computing platform.

According to the present invention, solving the problems that the traditional test benches are limited to local test and single in function, the test data need to be analysed and processed offline, and the calculation method, the calculation amount and the calculation speed are poor, making full use of the advantages of the cloud computing platform, decomposing a huge data calculation processing program into numerous small programs for processing and analysis, and effectively improving the bench function and the calculation efficiency.

The present invention is good in practicability and has wide application prospects in the field of testing of systems and parts of electric vehicles. According to the present invention, optimizing the test process and method and improving the efficiency and reliability of the electric vehicle bench test only by upgrading the network communication mode of the original old test bench to realize transformations such as the bidirectional real-time communication with the cloud computing platform, and developing corresponding big data analysis and processing programs, cloud controller algorithms, etc. on the cloud computing platform.

BRIEF DESCRIPTION OF DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

FIGURE is a schematic diagram of a system for a distributed networked test of electric vehicles based on a cloud platform.

DESCRIPTION OF EMBODIMENTS

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention.

As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

According to the present invention, the cloud platform, also known as a cloud computing platform, refers to a cloud service based on hardware resources and software resources, which can provide computing, network and storage functions, and can complete the processing of tens of thousands of data in a very short time (in few seconds), thereby achieving a powerful network service.

As shown in FIGURE, a system for a distributed networked test of electric vehicles based on a cloud platform, comprising at least one cloud computing platform and two or more remote test benches (or test platforms), wherein the cloud computing platform comprises but is not limited to a big data information base, a big data analysis and processing program, a cloud controller program, etc.; the test bench comprises but is not limited to a hybrid power system test bench, a motor drive system test bench, an engine test bench, a power battery charging and discharging test bench, a gearbox and transmission system test bench, a driver control test bench, etc., as well as an access user with only read permission, etc.

The cloud computing platform, comprising hardware resources and software resources, being configured to provide corresponding computing capacity, storage space and network services, and perform real-time bidirectional data communication with the remote test bench through wired or wireless networks, 5G network and other communication modes.

The remote test bench (or test platform), comprising at least two or more remote test benches to form a remote distributed network structure, and comprising but not limited to the hybrid power system test bench, the motor drive system test bench, the engine test bench, the power battery charging and discharging test bench, the gearbox and transmission system test bench, the driver control test bench, etc.

Each independent remote test bench has the structural characteristics of comprising a tested object (comprising but not limited to a driving motor, a power battery, a transmission system, a driver, etc.), data acquisition equipment, a computer and central control system, display equipment, power lines, data lines and other hardware resources of the test bench, and communicating with the cloud computing platform in real-time through wired or wireless networks, 5G network and other communication modes.

The access user, the number thereof is not limited, has only read permission, and can read the operation and monitoring data of the cloud computing platform through wired or wireless networks, 5G network and other communication modes with the help of electronic devices such as computers, platforms and mobile phones.

The cloud computing platform receives test data from the two or more remote test benches in real-time, and stores historical test data of each remote test bench; the real-time data and the historical data together form the big data information base of the cloud computing platform.

The cloud computing platform completes the big data analysis and processing through the processes of data cleaning, data classing cleaning, data fusion, data mining, etc., and further extracting useful data information from the big data as an input of the cloud controller.

The cloud controller comprises a data model and a mechanism model built on the cloud computing platform respectively according to the historical data and a mechanism of a control object (including but not limited to a drive motor, a power battery, a transmission system, a driver, etc.), and control algorithms for different remote test benches; the data information analyzed by the big data and processed by processing program is used as the information input of the cloud controller program to complete the design of functions of control instruction calculation, fault diagnosis and early warning, etc. of each remote test bench.

The cloud computing platform transmits and sends control instructions and fault diagnosis and early warning information, etc. to each test bench through the wired or wireless network, the 5G network and other communication modes.

The cloud computing platform, when receiving fault information from the one or more remote test benches, can send fault types to all online remote test benches and access users and display the fault types through the display module, and simultaneously issue a test pause control instruction to stop bench testing; after the fault information is eliminated, the collaborative test can be restarted.

A method for a distributed networked test of electric vehicles, comprising following steps:

step (1): receiving test data from two or more remote test benches in real-time, and storing historical test data of each remote test bench by a cloud computing platform; the real-time data and the historical data together form a big data information base of the cloud computing platform;

step (2): completing a big data analysis and processing by the cloud computing platform through data cleaning, data classing washing, data fusion, data mining, etc., further to extract useful data information therefrom as an input of a cloud controller;

step (3): the cloud controller comprises a data model and a mechanism model built on the cloud computing platform respectively according to the historical data and a mechanism of a control object (including but not limited to a drive motor, a power battery, a transmission system, a driver, etc.), and control algorithms for different remote test benches; the data information analyzed by the big data and processed by processing program is used as the information input of the cloud controller program to complete the design of functions of control instruction calculation, fault diagnosis and early warning, etc. of each the remote test bench;

step (4): transmitting the control instructions and information, such as the fault diagnosis and early warning, etc., to each remote test bench by the cloud computing platform through wired or wireless networks, a 5G network and other communication modes;

step (5): sending, by the cloud computing platform, fault types to all online remote test benches and access users and displaying the fault types through the display module when receiving fault information from one or more remote test benches, and simultaneously issuing the test pause control instruction to stop bench testing; restarting a collaborative test after the fault information is eliminated.

Those skilled in the art should understand that the examples of the present invention can be provided as methods, systems, or computer program products. Therefore, the present invention may take the form of hardware examples, software examples, or examples combining software and hardware aspects. Furthermore, the present invention may take the form of a computer program product implemented on one or more computer usable storage media (including but not limited to disk memory, CD-ROM, optical memory, etc.) containing computer usable program codes.

The present invention is described with reference to flowcharts and/or block diagrams of methods, devices (systems), and computer program products according to the examples of the present invention. It should be understood that each of the processes and/or boxes in the flowchart and/or block diagram, and the combination of the processes and/or boxes in the flowchart and/or block diagram, may be implemented by computer program instructions. These computer program instructions may be provided to a processor of a general purpose computer, a specialized computer, an embedded processor, or other programmable data processing device to produce a machine such that the instructions executed by the processor of the computer or other programmable data processing device produce a device for implementing the functions specified in one process or multiple processes of the flowchart and/or one box or multiple boxes of the block diagram.

These computer program instructions may also be stored in a computer-readable memory capable of directing the computer or other programmable data processing apparatus to operate in a particular manner such that the instructions stored in such the computer-readable memory produce an article of manufacture comprising an instruction device that implements the function specified in one process or a plurality of processes of the flowchart and/or one box or a plurality of boxes of the block diagram.

These computer program instructions may also be loaded onto a computer or other programmable data processing device to enable a series of operational steps to be performed on the computer or other programmable device to generate a computer implemented process, so that instructions executed on a computer or other programmable device provide steps for implementing functions specified in one process or a plurality of processes of the flowchart and/or in one box or a plurality of boxes of the block diagram.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

Although the specific embodiments of the invention are described above in combination with the accompanying drawings, it is not a limitation on the protection scope of the invention. Those skilled in the art should understand that on the basis of the technical scheme of the invention, various modifications or deformations that can be made by those skilled in the art without creative labor are still within the protection scope of the invention.

What is claimed is:

1. A system for a distributed networked test of electric vehicles based on a cloud platform, comprising a cloud computing platform and a plurality of remote test benches, wherein:
   the remote test benches, being provided at least two, to form a remote distributed networked structure and transmit test data to the cloud computing platform;
   the cloud computing platform, being in real-time bidirectional data communication with the remote test benches and configured to receive each test data in real-time and extract useful data information from the test data, to build a data model and a mechanism model on the cloud computing platform according to historical data and a mechanism of control object respectively, to control for different remote test benches, and to complete calculations of control instruction and a fault diagnosis and an early warning of each of the remote test benches; and further being configured to send a fault type to all online remote test benches and access users and then to display the fault type through a display module when receiving fault information from one or more remote test benches, and to issue a test pause control instruction to stop bench testing simultaneously; to restart a collaborative test after the fault information is eliminated.

2. The system according to claim 1, wherein: the remote test benches comprise at least one of a hybrid power system test bench, a motor drive system test bench, an engine test bench, a power battery charging and discharging test bench, a gearbox and transmission system test bench, and a driver control test bench.

3. The system according to claim 1, wherein: the cloud computing platform comprises a cloud controller, wherein the cloud controller is configured to build the data model and the mechanism model on the cloud computing platform according to the historical data and the mechanism of control object respectively, determine a control method for different remote test benches, and complete the calculation of control instruction and a design of the fault diagnosis and early warning function of each of the remote test benches.

4. The system according to claim 1, wherein: the cloud computing platform comprises a communication module, wherein the communication module is configured to be in a communication mode of a wired or wireless network or a 5G network communication, or
   the communication module is configured to be in the communication mode of the wired or wireless network and the 5G network communication.

5. The system according to claim 1, wherein: the cloud computing platform receives the test data of each of the remote test benches in real-time, and stores the historical data of each of the remote test benches; the test data received in real-time and the historical data together form a big data information base of the cloud computing platform.

6. A method for a distributed networked test of electric vehicles, comprising following steps:
   receiving test data from two or more remote test benches in real-time, and storing historical test data of each of the remote test benches;
   carrying out a big data analysis and processing, then extracting useful data information therefrom;
   building a data model and a mechanism model according to the historical data and a mechanism of control object, determining a control method aiming at different remote test benches and forming a control instruction;
   transmitting and sending the control instruction and sending information of fault diagnosis and early warning to each of the remote test benches to carry out a test experiment; and
   sending a fault type to all online remote test benches and access users and displaying the fault type through a display module when receiving fault information from one or more the remote test benches, and issuing a test pause control instruction to stop the test experiment simultaneously; restarting a collaborative test after the fault information is eliminated.

7. The method according to claim 6, wherein a process of the big data analysis and processing comprises a data cleaning, a data classing washing, a data fusion and a data mining.

8. A non-transitory computer-readable storage medium, having stored therein a plurality of instructions, wherein the instructions are adapted to be loaded by a processor of a terminal device and to execute the method for the distributed networked test of the electric vehicles of claim 6.

9. A terminal device, comprising a processor and a computer-readable storage medium, wherein the processor is configured to implement instructions, and the computer-readable storage medium is used for storing a plurality of instructions, wherein the instructions are adapted to be loaded by the processor and to execute the method for
   the distributed networked test of the electric vehicles of claim 6.

* * * * *